No. 701,776. Patented June 3, 1902.
A. VALVONA.
APPARATUS FOR BAKING BISCUIT CUPS FOR ICE CREAM.
(Application filed July 12, 1901.)
(No Model.)
FIG. 1. FIG. 2. FIG. 4. FIG. 6.
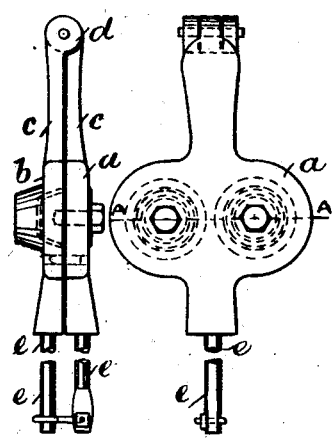
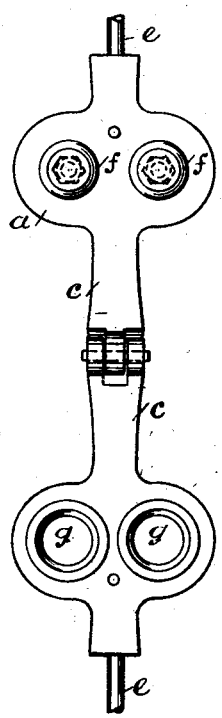
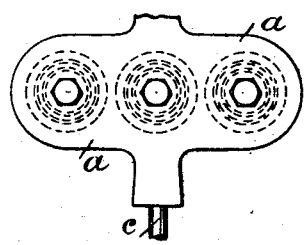
FIG. 5.
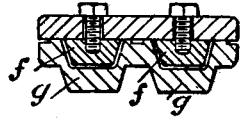
FIG. 3.
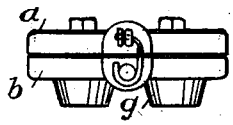
FIG. 7. FIG. 8.
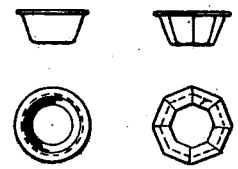
WITNESSES:
G. W. Wright
S. C. Connor
INVENTOR
ANTONIO VALVONA
BY
Howson and Howson
HIS ATTORNEYS

UNITED STATES PATENT OFFICE.

ANTONIO VALVONA, OF MANCHESTER, ENGLAND.

APPARATUS FOR BAKING BISCUIT-CUPS FOR ICE-CREAM.

SPECIFICATION forming part of Letters Patent No. 701,776, dated June 3, 1902.

Application filed July 12, 1901. Serial No. 68,092. (No model.)

*To all whom it may concern:*

Be it known that I, ANTONIO VALVONA, a subject of the King of Italy, residing at 96 Great Ancoats street, Manchester, in the county of Lancaster, England, have invented new and useful Improved Apparatus for Baking Biscuit-Cups for Ice-Cream, of which the following is a specification.

This invention consists of a novel apparatus for baking biscuit-cups in which to dispense ice-cream.

In the accompanying drawings, Figure 1 is a side view, Fig. 2 a plan, and Fig. 3 an end view, of the aforesaid apparatus when closed. Fig. 4 is a plan of the apparatus as seen when open. Fig. 5 is a transverse section on line A A. Fig. 6 is a plan showing a modification, and Figs. 7 and 8 illustrate samples that may be produced by said apparatus.

In the views similar letters refer to similar parts.

By the use of the apparatus of this invention I make cups or dishes of any preferred shape or design from dough or paste in a fluid state that is preferably composed of the same materials as are employed in the manufacture of biscuits, and when baked the said cups or dishes may be filled with ice-cream, which can then be sold by the venders of ice-cream in public thoroughfares or other places. In order to produce said cups or dishes, I provide a combined metallic mold and oven consisting of two plates, as $a$ and $b$, each of said plates having a piece $c$ projecting from its edge at one side, connected by a hinge $d$, and each plate provided with a handle $e$, projecting from its opposite edge. The faces of the aforesaid two plates are provided or formed, respectively, with one or more cores $f$ and dies $g$, one fitting into the other, with a small space between them, when the faces of said plates are placed close to each other. All the heat absorbing and conducting sides of the mold are of substantially the same thickness, so that heat may be evenly conducted through the body of the mold, as will be seen by reference to the drawings.

The biscuit dough or paste, which is of the consistency of a thick fluid, is poured from a can, that may be provided with one or more spouts for depositing the required quantity of paste either successively or simultaneously in each of the dies or molds $g$. The plates are then closed, and the cup or dish is formed by the dough being pressed into the space between the core $f$ and the mold $g$. It is then baked by the apparatus being placed over a gas or other fire, the formation of said apparatus enabling it to be turned as frequently as required, and the biscuit-cup thereby uniformly baked. To make these thin-shaped cups satisfactorily from paste, with the thin walls described, and to insure their proper "turning out" of the molds in good shape, properly baked, I find it necessary to first heat the molds, then pour in the batter and bake with the projections downward for awhile, then reverse the mold and bake in that position. This enables me to readily remove the cups from the mold in perfect condition, and to this end I have constructed my mold so as to enable it to be readily reversed and to occupy a stable position on the top of the gas-range or the like. The cups or dishes thus produced may be either of the shape shown in Figs. 7 and 8 or of other preferred pattern, according to the shape of the cores and dies employed, either or both of which may be capable of being removed and replaced by others in the manner shown in Fig. 5.

I claim as my invention—

A combined mold and oven for producing biscuit cups or dishes, consisting of two metal plates connected together by a hinge and provided with handles and means for securing said plates in closed position, the opposing inner faces of the said plates being provided, one with a projecting core and the other with an indented mold in the metal of such face into which the core fits with a small space between the two, and the outer faces being so formed as to be adapted to rest on the top surface of a stove either side up so that heat may be evenly conducted through the body of the mold, all the heat absorbing and conducting sides of the mold being of substantially the same thickness, whereby a cup may first be formed with the projections downward and afterward baked in the reverse position to facilitate the baking and allow the cup to be turned out of the mold, as and for the purpose described.

In testimony whereof I have signed my name to this specification in the presence of two subscribing witnesses.

ANTONIO VALVONA.

Witnesses:
　THOS. PRESCOTT,
　J. ERNEST HUGHES.